United States Patent
Lin (10) Patent No.: US 9,301,164 B2
(45) Date of Patent: Mar. 29, 2016

(54) METHOD, SYSTEM, AND TERMINAL FOR PERFORMING SYSTEM UPDATE BETWEEN MOBILE COMMUNICATION TERMINALS

(71) Applicant: HUAWEI DEVICE CO., LTD., Shenzhen (CN)

(72) Inventor: Liang Lin, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 120 days.

(21) Appl. No.: 14/070,818

(22) Filed: Nov. 4, 2013

(65) Prior Publication Data
US 2014/0057620 A1 Feb. 27, 2014

Related U.S. Application Data

(63) Continuation of application No. PCT/CN2011/073643, filed on May 4, 2011.

(51) Int. Cl.
*H04M 3/00* (2006.01)
*H04W 24/02* (2009.01)
(Continued)

(52) U.S. Cl.
CPC ............... *H04W 24/02* (2013.01); *G06F 8/65* (2013.01); *G06F 8/665* (2013.01); *H04L 41/082* (2013.01); *H04L 41/0856* (2013.01); *H04L 67/34* (2013.01)

(58) Field of Classification Search
CPC ..... G06F 8/65; G06F 9/4411; G06F 11/1469; G06F 9/4401; G06F 11/1464; G06F 8/61; G06F 8/665; G06F 11/1456; G06F 19/3418; G06F 9/44; G06F 17/30893; G06F 2221/0782; H04N 7/162; H04M 1/72525; H04M 1/72; H04L 41/082; H04L 67/34; H04L 63/20; H04W 4/20; H04W 8/005; H04W 4/025; H04W 24/00; H04W 24/02; H04W 88/16; H04W 24/10; H04W 36/0083
USPC ............. 455/13.2, 422.1, 502, 418, 419, 411, 455/466, 414.1, 456.1, 457, 458, 507, 455/127.1; 717/173, 171, 174, 168, 178; 725/152, 132, 140, 100, 106; 707/654, 707/674
See application file for complete search history.

(56) References Cited

U.S. PATENT DOCUMENTS

2004/0142711 A1* 7/2004 Mahonen et al. ............. 455/502
2005/0108700 A1 5/2005 Chen et al. .................... 717/168
(Continued)

FOREIGN PATENT DOCUMENTS

CN 1858707 A 11/2006
CN 101163055 A 4/2008
(Continued)

OTHER PUBLICATIONS

International Search Report issued Feb. 16, 2012, in corresponding International Patent Application No. PCT/CN2011/073643.
(Continued)

*Primary Examiner* — Fred Casca
(74) *Attorney, Agent, or Firm* — Staas & Halsey LLP (57) ABSTRACT

A method, a system, and a terminal for performing a system update between mobile communication terminals. The method includes: determining, by a target mobile terminal, whether hardware is compatible with a source mobile terminal; if the hardware is compatible between both terminals, obtaining, by the target mobile terminal through a wireless network, a system backup file transferred by the source mobile terminal; and performing, by the target mobile terminal, a system update according to the system backup file. A system update can be implemented between mobile phones through a wireless network without depending on an update server or downloading an update file from the update server, thereby reducing the burden of the update server, and facilitating exchange of systems between mobile phone users.

13 Claims, 10 Drawing Sheets

(51) Int. Cl.
*G06F 9/445* (2006.01)
*H04L 12/24* (2006.01)
*H04L 29/08* (2006.01)

(56) References Cited

U.S. PATENT DOCUMENTS

| | | | |
|---|---|---|---|
| 2007/0008893 A1* | 1/2007 | Singh et al. | 370/241 |
| 2007/0168571 A1* | 7/2007 | Ramsey et al. | 710/8 |
| 2009/0088145 A1* | 4/2009 | Inohiza | 455/419 |
| 2010/0146497 A1 | 6/2010 | Kogan et al. | |
| 2010/0313105 A1* | 12/2010 | Nekoomaram et al. | 714/807 |

FOREIGN PATENT DOCUMENTS

| | | |
|---|---|---|
| CN | 101711026 A | 5/2010 |
| CN | 101867694 A | 10/2010 |
| WO | 2006/000122 A1 | 1/2006 |

OTHER PUBLICATIONS

Chinese Office Action issued Nov. 29, 2012, in corresponding Chinese Patent Application No. 201180000646.4.
Chinese Office Action issued May 6, 2013, in corresponding Chinese Patent Application No. 201180000646.4.
Chinese Office Action issued Aug. 13, 2013, in corresponding Chinese Patent Application No. 201180000646.4.
Extended European Search Report dated Mar. 21, 2014 in corresponding European Patent Application 11768456.3.

* cited by examiner

METHOD, SYSTEM, AND TERMINAL FOR PERFORMING SYSTEM UPDATE BETWEEN MOBILE COMMUNICATION TERMINALS

CROSS-REFERENCE TO RELATED APPLICATIONS

This application is a continuation of International Application No. PCT/CN2011/073643, filed on May 4, 2011, which is hereby incorporated by reference in its entirety.

FIELD OF THE INVENTION

Embodiments of the present invention relate to the communication field, and in particular, to a method, a system, and a terminal for performing a system update between mobile communication terminals.

BACKGROUND OF THE INVENTION

Figure 1:
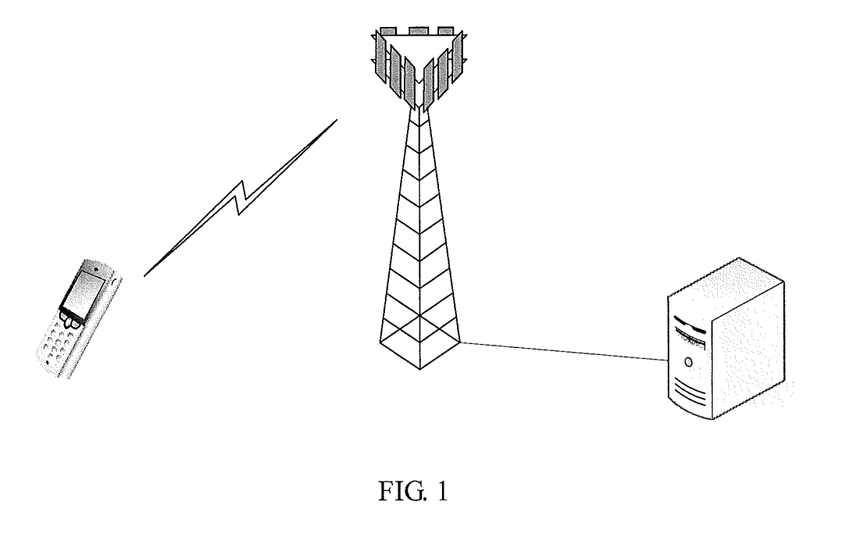
FIG. 1 is a schematic diagram of a wireless update in the prior art.

FIG. 1 is a schematic diagram of a wireless update in the prior art. The wireless update is generally performed in an OTA (Over-the-Air Technology, over-the-air technology) manner by downloading an update package from an update server of an operator to a cache partition or an SD card (Secure Digital Memory Card, secure digital memory card) in a mobile phone and then starting installation of the update package. In view of the tariff in the download process, a smaller update package is preferred. Therefore, a differential mode is generally applied. However, the OTA-based update process is still vulnerable to undiscovered Bugs or power interruption in the update process.

Figure 1A:
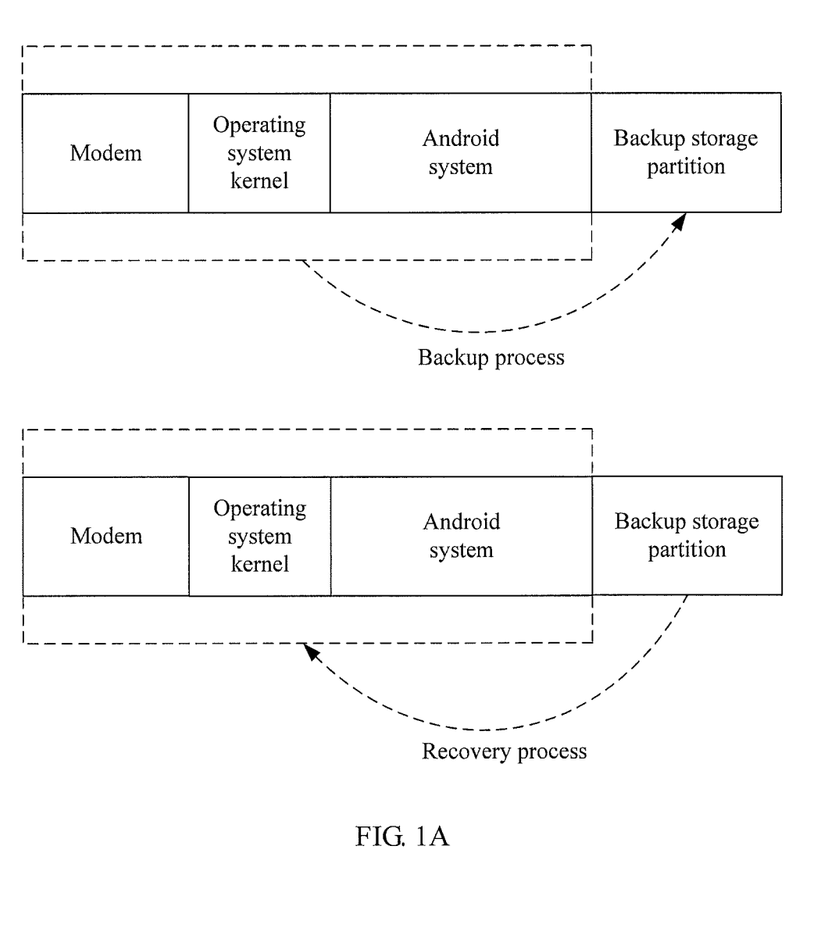
FIG. 1A is a schematic diagram of a process of backing up/recovering an Android system in the prior art.

In the prior art, a mature Linux LiveCD (directly booted as an available system) solution is available on a PC. For example, an UBUNTU (a Linux operating system that specializes in desktop applications) and a FEDORA (a Linux operating system) have a LiveCD version released. The PC also has a tool for backing up Drive C, that is, a system drive, on the hard disk, as a file, and performing recovery. In addition, some Android smart phones are capable of backing up/recovering an android system through a recovery menu. FIG. 1A is a schematic diagram of a process of backing up/recovering an Android system in the prior art. In FIG. 1A, a dotted box indicates backup/recovered content, and a dotted arrow indicates a backup/recovery operation.

In the process of implementing the present invention, the inventor finds that the prior art has at least the following disadvantages: The update method in the prior art depends on a professional update server, and makes the update inconvenient and is not conducive to the system exchange or update between users. Moreover, the update method in the prior art does not consider whether a system update file to be written into a mobile phone is compatible with a hardware version of the mobile phone, which leads to risks of update failure. Once the update fails, the mobile phone will not work normally. The update method in the prior art is also disadvantageous in security.

SUMMARY OF THE INVENTION

Embodiments of the present invention provide a method, a system, and a terminal for performing a system update between mobile terminals, and thereby make the mobile terminal update more convenient and secure without depending on a professional update server of an operator, improve the update success rate, and reduce risks of malfunction caused by update failure of the mobile terminal.

To fulfill the above, in one aspect, an embodiment of the present invention provides a method for performing a system update between mobile communication terminals, where the method includes: determining, by a target mobile terminal, whether hardware is compatible with a source mobile terminal; if the hardware is compatible between both terminals, obtaining, by the target mobile terminal through a wireless network, a system backup file transferred by the source mobile terminal; and performing, by the target mobile terminal, a system update according to the system backup file.

To fulfill the above objectives, in another aspect, an embodiment of the present invention provides a mobile communication terminal, which includes: a wireless communication unit, configured to establish a wireless connection with a source mobile terminal that provides a system backup file, and obtain hardware information of the source mobile terminal; a hardware compatibility determining unit, configured to determine, according to the hardware information of the source mobile terminal, whether hardware is compatible with the source mobile terminal, and trigger the wireless communication unit to obtain the system backup file from the source mobile terminal if the hardware is compatible; and a system updating unit, configured to perform a system update according to the system backup file.

To fulfill the above objectives, in still another aspect, an embodiment of the present invention provides a system for performing a system update between mobile communication terminals, where the system includes: a target mobile terminal, configured to: obtain hardware information of a source mobile terminal, and determine, according to the hardware information of the source mobile terminal, whether hardware is compatible with the source mobile terminal; obtain a system backup file from the source mobile terminal if the hardware is compatible; and perform a system update according to the system backup file; and the source mobile terminal, wirelessly connected with the target mobile terminal and configured to provide the hardware information of the source mobile terminal and the system backup file for the target mobile terminal.

The above technical solutions provided in the embodiments of the present invention have the following advantages: A system update can be implemented between mobile phones through a wireless network without depending on an update server or downloading an update file from the update server, thereby reducing the burden of the update server, facilitating exchange of systems between mobile phone users, and implementing the system update conveniently. By determining whether hardware is compatible between both terminals before the upgrade, the update success rate is ensured. The embodiments of the present invention provide users with more update modes that are convenient and available for selection so that the users do not solely depend on the server of the operator or professionals.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from the accompanying drawings without creative efforts.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In the embodiments of the present invention, a mobile communication terminal such as a mobile phone of a user can use Bluetooth or WIFI to obtain a system backup file generated by another hardware-compatible mobile phone, and perform an update to implement a system update or start a new system in an installation-free mode. That process is also known as mobile phone "cloning".

Figure 2:
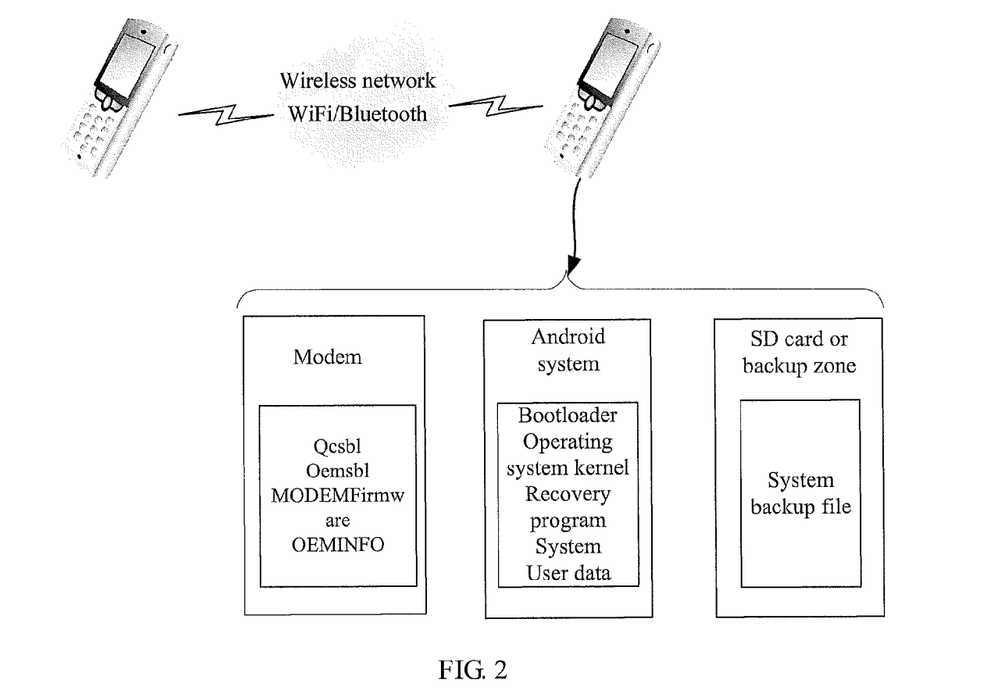
FIG. 2 is a schematic structural diagram of a system for performing a system update between mobile communication terminals according to an embodiment of the present invention.

FIG. 2 is a schematic structural diagram of a system for performing a system update between mobile communication terminals according to an embodiment of the present invention. As shown in FIG. 2, the system includes:

a target mobile terminal, configured to: obtain hardware information of a source mobile terminal, and determine, according to the hardware information of the source mobile terminal, whether hardware is compatible with the source mobile terminal; obtain a system backup file from the source mobile terminal if the hardware is compatible; and perform a system update according to the system backup file; and the source mobile terminal, wirelessly connected with the target mobile terminal and configured to provide the hardware information of the source mobile terminal and the system backup file for the target mobile terminal.

Bluetooth (Bluetooth) and WIFI (Wireless Fidelity, 802.11b standard) is a free communication mode between mobile phones, where WIFI provides a higher speed. The target mobile terminal and the source mobile terminal may be interconnected through the above short-distance wireless network to transfer the hardware information and system backup file.

The hardware information may include: a hardware version identifier BoardID; a minor hardware version number; key hardware information that includes processor information, memory information, and a network type; a driver identifier Driver ID, and so on. The network types include CDMA (Code Division Multiple Access, Code Division Multiple Access), WCDMA (Wideband Code Division Multiple Access, Wideband Code Division Multiple Access), TD-SCDMA (Time Division-Synchronous Code Division Multiple Access, Time Division-Synchronous Code Division Multiple Access), or GSM (Global System for Mobile Communications, Global System for Mobile Communications), and so on.

The system backup file may be stored in an SD card or in a backup zone of the mobile terminal itself. The system backup file may be backup of an entire system of a mobile terminal, for example, may include image files of a modem Modem and image files of an operating system. For example, the image files of the Modem include Qcsbl (Qualcomm Secondary Bootloader, Qualcomm secondary bootloader), Oemsbl (OEM Secondary Bootloader, OEM secondary bootloader), MODEM Firmware (modem firmware, that is, a communication protocol stack of a modem), OEMINFO (OEM information), and so on. Alternatively, only a part is backed up. For example, only a bootloader in the operating system, a kernel of the operating system, and a recovery program are backed up. Alternatively, the communication protocol stack may be further backed up, and user configuration data may be further backed up. The above operating systems may include an Android system, a Windows Mobile system, and so on. The source mobile terminal and the target mobile terminal may have two kernels or more processors.

In the embodiment of the present invention, two mobile terminals perform a system update through a wireless communication network such as a Bluetooth or WIFI network without depending on a professional update server of an operator or professionals, thereby facilitating the update of a mobile terminal; whether hardware is compatible between both terminals is determined, and, if the hardware is compatible, system backup files are transferred to perform a system update, thereby ensuring the update success rate, reducing the risk of update failure of the mobile terminal, and preventing the target mobile terminal that needs a system update from malfunction caused by update failure.

Figure 3:
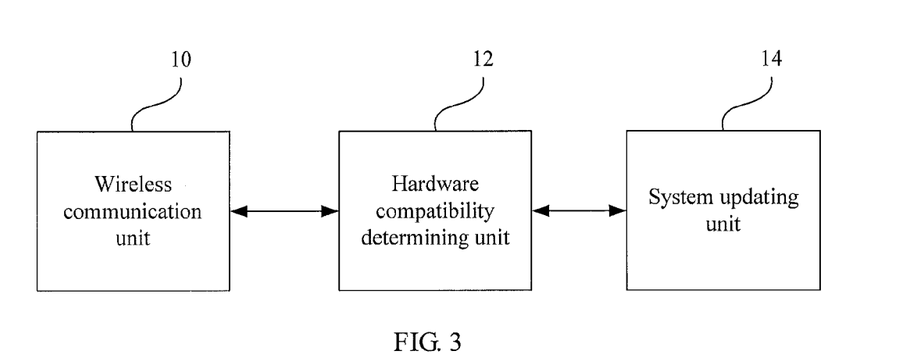
FIG. 3 is a functional block diagram of a mobile communication terminal according to an embodiment of the present invention.

An embodiment of the present invention further provides a mobile communication terminal corresponding to the above target mobile terminal. FIG. 3 is a functional block diagram of a mobile communication terminal according to an embodiment of the present invention. As shown in FIG. 3, it includes: a wireless communication unit 10, configured to establish a wireless connection with a source mobile terminal that provides a system backup file, and obtain hardware information of the source mobile terminal; a hardware compatibility determining unit 12, configured to determine, according to the hardware information of the source mobile terminal, whether hardware is compatible with the source mobile terminal, and trigger the wireless communication unit to obtain the system backup file from the source mobile terminal if the hardware is compatible; and a system updating unit 14, configured to perform a system update according to the system backup file. Because data exchange between two mobile terminals is involved, when necessary, for example, when the target mobile terminal obtains hardware information of the source mobile terminal or obtains a system backup file from the source mobile terminal, the interaction between both terminals needs to be confirmed by a user operation.

Optionally, the hardware information includes a hardware version identifier BoardID, and the hardware compatibility determining unit 12 may be further configured to determine that hardware is compatible between both terminals when the BoardID is the same between the mobile communication terminal and the source mobile terminal.

Optionally, the hardware information further includes a minor hardware version number, and the hardware compatibility determining unit 12 may be further configured to determine that hardware is compatible between both terminals when the BoardID is different but the minor hardware version number is the same between the mobile communication terminal and the source mobile terminal.

Optionally, the hardware information further includes processor information, memory information, and network type, and the hardware computability determining unit 12 may be specifically configured to: when neither the BoardID nor the minor hardware version number is the same between the mobile communication terminal and the source mobile terminal, further determine whether processor information (such as Qualcomm MSM7201A/MSM8255 chip and MARVELL PXA320 chip), memory information (such as samsung NAND FLASH model KA524GACB-A050 and hynix NAND FLASH model H8BCS0UN0MCR-4EM) and network type are the same between both terminals, and, if not, determine that the hardware is incompatible between both terminals.

Optionally, the hardware information further includes a driver identifier DriverID, and the hardware compatibility determining unit 12 may be specifically configured to: if neither the BoardID nor the minor hardware version number is the same, but the processor information, the memory information, and the network type are the same between the mobile communication terminal and the source mobile terminal, further determine whether the DriverID is the same between both terminals, and, if so, determine that the hardware is compatible between both terminals.

Alternatively, the hardware compatibility determining unit 12 may be further configured to: when the DriverID of the mobile communication terminal is different from the DriverID of the source mobile terminal, determine whether the DriverID of the mobile communication terminal exists in a set of DriverIDs of hardware of the same type as the source mobile terminal, and, if so, determine that the driver is compatible between both terminals, that is, the hardware is compatible. For example, plug/unplug detection for a hardware peripheral interface—a T-Flash card, may be performed in either an interrupt mode or a polling mode. The interrupt mode requires the hardware to additionally provide an interrupt pin, but the polling mode does not require it. Therefore, for the same type of hardware peripheral interface, two types of software drivers, DriverID101 and DriverID102, are required. When the software driver run by a T-Flash card of the target mobile communication terminal to be updated is DriverID101 but the source mobile terminal is using DriverID102, if the user data storage space of the source mobile terminal has configuration data of DriverID101, the configuration data may be loaded for running, and therefore the T-Flash card interface is still compatible between the target mobile communication terminal and the source mobile terminal.

Specifically, the system updating unit 14 is configured to install the obtained system backup file to perform a system update; or run the system backup file directly without installing the system backup file. The manner of starting the system from the system backup file directly without installing the system backup file ensures security.

Figure 3A:
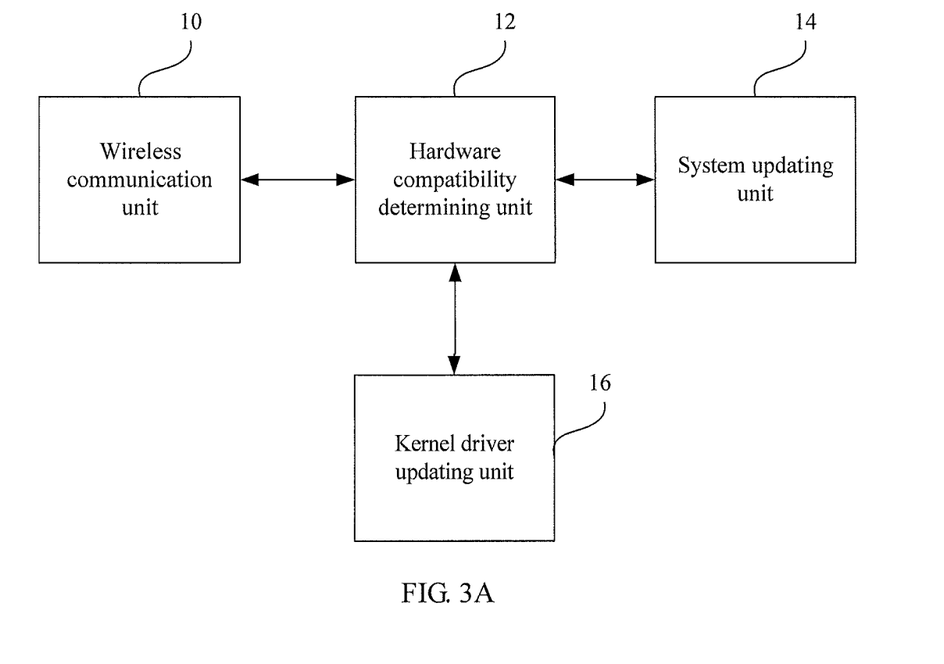
FIG. 3A is a functional block diagram of another mobile communication terminal according to an embodiment of the present invention.

FIG. 3A is a functional block diagram of another mobile communication terminal according to an embodiment of the present invention. As shown in FIG. 3A, the mobile communication terminal further includes a kernel driver updating unit 16, configured to update a kernel driver of an operating system of the mobile communication terminal according to driver configuration data in the system backup file.

Figure 3B:
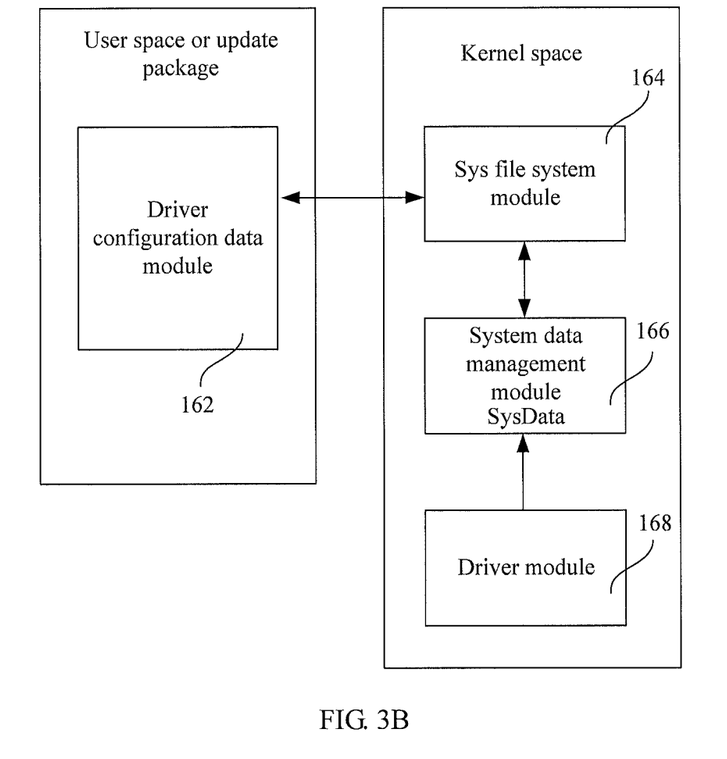
FIG. 3B is a detailed functional block diagram of a kernel driver updating unit shown in FIG. 3A according to an embodiment of the present invention.

FIG. 3B is a detailed functional block diagram of the kernel driver updating unit shown in FIG. 3A according to an embodiment of the present invention. As shown in FIG. 3B, the kernel driver updating unit 16 specifically includes:

a driver configuration data module 162, configured to obtain driver configuration data, for example, obtain the data from an update package that carries the system backup file, or, if the system backup file has been installed, obtain the data from a user space;

a Sys file system module 164, configured to import the driver configuration data into a kernel of an operating system of the target mobile communication terminal; or, further configured to export configuration data of the kernel driver for saving;

a system data management module 166, configured to: map the driver configuration data imported by the Sys file system module to a configuration data link table, where the configuration data link table includes a process point sequence number, a sub-process function number corresponding to the process point sequence number, and a parameter of a sub-process function; when the kernel driver needs to be updated, search the configuration data link table for a process point corresponding to the process point sequence number according to the process point sequence number; obtain a sub-process function number corresponding to the process point and the parameter of the sub-process function according to the process point searched out and the configuration data link table; and call a sub-process function corresponding to the sub-process function number in a sub-process function library, and input the parameter of the sub-process function to update the kernel driver; and a driver module 168, configured to cause the system data management module to update the kernel driver, and transfer the process point sequence number to the system data management module.

The advantages of the embodiment of the present invention lie in: 1. relieving the burden of the update server; 2. using a free communication mode to implement convenient and secure transfer of a mobile phone system between the user's mobile phones; 3. loading a backup file into the system directly and requiring no installation of the file, which is the most secure update mode; and 4. implementing the update of the kernel driver.

Figure 4:
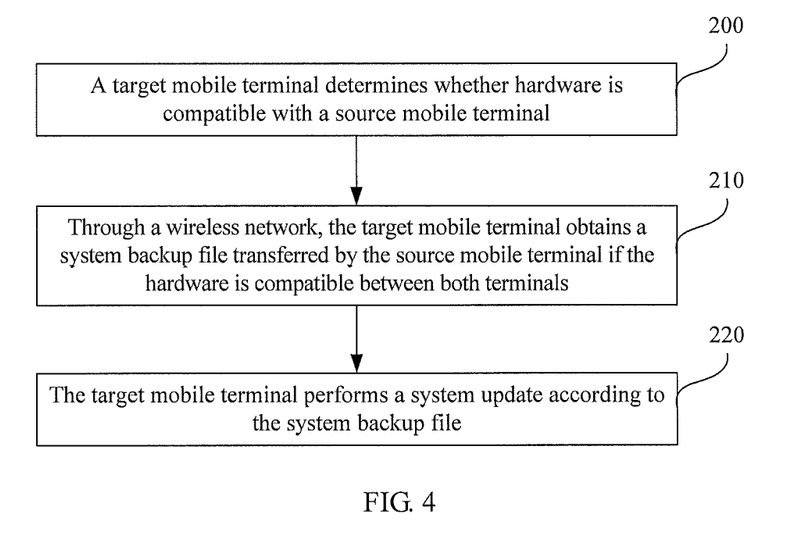
FIG. 4 is a flowchart of a method for performing a system update between mobile communication terminals according to an embodiment of the present invention.

An embodiment of the present invention further provides a method for performing a system update between mobile communication terminals. FIG. 4 is a flowchart of a method for performing a system update between mobile communication terminals according to an embodiment of the present invention. As shown in FIG. 4, the method includes:

Step 200: A target mobile terminal determines whether hardware is compatible with a source mobile terminal.

Step 210: If the hardware is compatible between both terminals, the target mobile terminal obtains through a wireless network a system backup file transferred by the source mobile terminal.

Step 220: The target mobile terminal performs a system update according to the system backup file.

Step 200 may specifically include: determining, by the target mobile terminal, whether it has the same hardware version identifier BoardID as the source mobile terminal, and, if so, determining that the hardware is compatible between both terminals.

Further, if the target mobile terminal determines that it has a different hardware version identifier BoardID from the source mobile terminal, the target mobile terminal further determines whether both terminals have the same minor hardware version number, and, if so, determines that the hardware is compatible between both terminals.

Further, if the target mobile terminal determines that it has a different minor hardware version number from the source mobile terminal, the target mobile terminal further determines whether both terminals have the same processor, memory, and network type, and, if not, determines that the hardware is incompatible between both terminals.

Further, if the target mobile terminal determines that it has the same processor, memory, and network type as the source mobile terminal, the target mobile terminal further determines whether both terminals have the same driver identifier DriverID, and, if so, determines that the driver and hardware are compatible between both terminals. Alternatively, the target mobile terminal further determines whether the software driver identifier of the target mobile terminal is included in a set of driver identifiers of the source mobile terminal, and, if so, it is determined that the driver is compatible between the target mobile terminal and the source mobile terminal; if not, it is determined that the driver is incompatible. Alternatively, the target mobile terminal obtains a list of DriverIDs of all peripherals of the source mobile terminal, and compares the list with a list of DriverIDs of all its own peripherals, and, if the DriverID of every peripheral is the same between both terminals, determines that the driver is compatible between the target mobile terminal and the source mobile terminal.

Optionally, the method shown in FIG. 4 further includes: displaying, on a man-machine interface of the target mobile terminal, a hardware compatibility report or a hardware compatibility index between the target mobile terminal and the source mobile terminal. The hardware compatibility report may include the following: Both terminals have the same BoardID, and therefore, the hardware is completely compatible; both terminals have different BoardIDs but the same minor hardware version number, and therefore, the hardware is basically compatible; both terminals have different BoardIDs, minor hardware version numbers, CPUs, memories, and network types, and therefore, the hardware is incompatible; both terminals have different BoardIDs and minor hardware version numbers, but have the same CPU, memory, and network type, and have compatible drivers, and therefore, the hardware is basically compatible; both terminals have different BoardIDs and minor hardware version numbers, but have the same CPU, memory, and network type, and have incompatible drivers, and therefore, the hardware is incompatible. Optionally, if the hardware is compatible, the allocated hardware compatibility index is 100%; if the hardware is basically compatible, the allocated hardware compatibility index is 60%; if the hardware is incompatible, the allocated hardware compatibility index is 30%.

Specifically, the specific process of step 200 may include: installing, by the target mobile terminal, the obtained system backup file to perform a system update; or, running, by the target mobile terminal, the system backup file directly without installing the system backup file.

Optionally, the system backup files include a system boot file, an operating system kernel, and an operating system. In addition, the system backup files may further include a communication protocol stack and/or user configuration data. The user configuration data may be used to update the kernel driver of the operating system of the mobile communication terminal.

Optionally, the method further includes: exporting and saving files corresponding to drivers that are incompatible between the target mobile terminal and the source mobile terminal.

Further, the method shown in FIG. 4 may include the following steps: obtaining driver configuration data; importing the driver configuration data into a kernel of an operating system of the target mobile communication terminal; mapping the driver configuration data to a configuration data link table, where the configuration data link table includes a process point sequence number, a sub-process function number corresponding to the process point sequence number, and a parameter of a sub-process function; when the kernel driver needs to be updated, searching the configuration data link table for a process point corresponding to the process point sequence number according to the process point sequence number; obtaining a sub-process function number corresponding to the process point according to the process point searched out and the configuration data link table; and calling a sub-process function corresponding to the sub-process function number in a sub-process function library, and inputting the parameter of the sub-process function to update the kernel driver.

The method for performing a system update between mobile communication terminals according to the embodiment of the present invention have the following beneficial technical effects:

1. relieving the burden of the update server;
2. using a free communication mode to implement convenient and secure transfer of a mobile phone system between the user's mobile phones; and
3. loading a backup file into the system directly and requiring no installation of the file, which is a more secure update mode.

Figure 5:
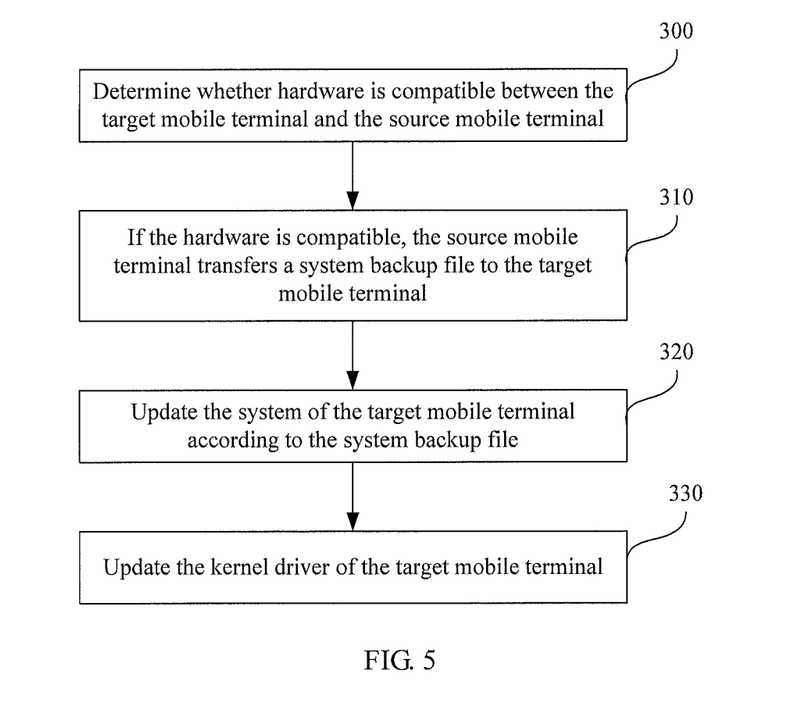
FIG. 5 is a flowchart of an example of a system update between mobile phones according to an embodiment of the present invention.

Examples are given to describe the technical solutions of the embodiments of the present invention in more detail. FIG. 5 is a flowchart of an example of a system update between mobile phones according to an embodiment of the present invention. As shown in FIG. 5, the procedure includes the following steps:

Step 300: Through the interaction between mobile terminals, determine whether hardware is compatible between a target mobile terminal and a source mobile terminal. According to the extent of hardware compatibility, an index value indicative of the compatibility extent is displayed on a graphical user interface (UI, User Interface) of the mobile communication terminal as a basis for the user to decide whether to transfer and run the update package. The above process includes the following steps:

Step 1: A module responsible for interaction between the source terminal and the target terminal each reads a /proc file system of both terminals to obtain a hardware version identifier BoardID planned uniformly by the vendor, and then compares whether both terminals have the same BoardID; and if so, determines that the hardware is exactly the same between both terminals, that is, the compatibility index is 100%. The compatibility index may be displayed to the user for reference. If both terminals have different BoardIDs, a further judgment is made about whether the minor hardware version number is the same. Because the BoardID includes a major version number and a sub-version number, if the major version number is the same but the sub-version number is different, the hardware is basically compatible, or in other words, incompletely compatible.

Step 2: By reading the /proc file system, obtain key information of both terminals, including CPU, memory RAM/ROM, and network type CDMA/WCDMA/TD-SCDMA/GSM. Determine whether the CPU, the memory RAM/ROM, and the network type CDMA/WCDMA/TD-SCDMA/GSM are the same between both terminals; if they are the same, the hardware is basically compatible, that is, the system can be started and will not become a "brick", and the compatibility index displayed to the user may be 60%, for example. A further judgment needs to be made about whether other driver information is the same; when such information is different, it is determined that the hardware is incompatible between both terminals, and the compatibility index is 30%, for example.

Step 3: Through the sysfs file system, check information about other drivers, that is, software driver identifier DriverID uniformly planned by the vendor. The sysfs file system is similar to a Windows registry, and is a file system for exporting objects inside a kernel and attributes of the objects, and also relationships between the objects. It organizes the devices, buses and drivers, and so on, which are connected to the system, into a hierarchical file. In starting the kernel, the root partition is not mountable without the sysfs file system. After the sysfs is disabled, a root partition needs to be specified by using a device number in a kernel boot parameter. Each driver has a corresponding process point in the sysfs file system, and the driver code needs to support reading of configuration information of each driver. If the DriverID is the same, the driver is compatible; if the DriverID is different, a further check may be made about whether the default DriverID of the mobile phone to be updated exists in a DriverID set of hardware devices of the same type as a source mobile phone that provides the update package, and, if so, it is also determined that the driver is compatible.

Step 4: If a DriverID is incompatible, the configuration information may be exported and stored separately first, and will be imported again after a new system is installed. Alternatively, the configuration information may be exported and stored into a specific zone of update.zip as a part of the update package.

Step 310: If the hardware is compatible, the source mobile terminal transfers a system backup file to the target mobile terminal. Specifically, an Android upper-layer application APK calls a Bluetooth or WIFI interface and function to implement file transfer. The APK performs wireless interaction, and also needs to support SD card reading and writing and zip file compression/decompression. If the source mobile terminal has no system backup file, the source mobile terminal backs up the system to generate system backup files. The following describes a process of full backup performed by the source mobile terminal and the format of backup files.

Figure 6:
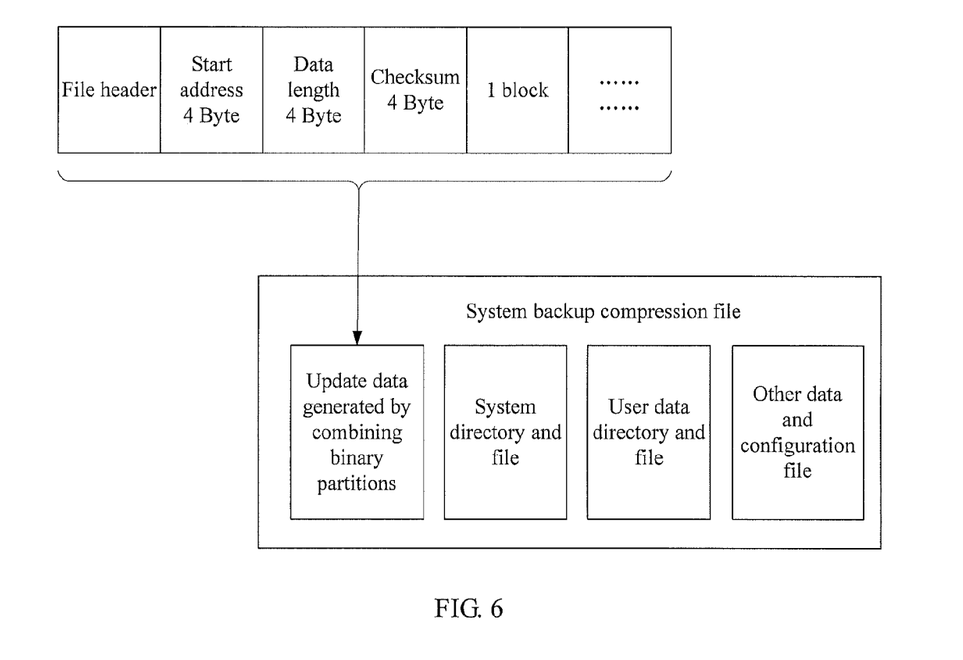
FIG. 6 is a schematic structural diagram of a system backup package according to an embodiment of the present invention.

In the source mobile terminal, the Android upper-layer code calls an MTD (memory technology device, memory technology device) driver. The MTD provides an abstract interface between the hardware and the file system, reads binary partitions, and combines all partitions into one file and stores the file into a zip file. The partitions of a file system are generally read in the form of files, and are stored in a folder of the same name in the zip file. The format of backup files is similar to a Google OTA zip file update package. FIG. 6 is a schematic structural diagram of a system backup package according to an embodiment of the present invention. As shown in FIG. 6, the format of the file generated by combining all binary partitions is as follows:

a) a file header, including a start position and an end position of each partition, and version control information;
b) a start address, for example, with a length of 4 bytes;
c) a data length, for example, a length of 4 bytes;
d) a checksum CHECKSUM, for example, with a length of 4 bytes; and
e) data, for example, 1 Block.

Appsboot.mbn is renamed initsd (init from sdcard, a module for initializing external media and loading the system), and packed into a single zip file. When the system update starts, it is necessary to decompress the initsd file to a root directory of the SD card, and the entire backup file is compressed and stored in a user zone or an SD card in a zip mode.

Step 320: Update the system of the target terminal according to the system backup file, which comes in two circumstances. In one circumstance, install the obtained system backup file to update the system; in the other circumstance, running the system backup file directly without installing the system backup file.

The detailed steps of installing a new system from a backup zip file include the following:

After loading the initsd file, the OEMSBL may update all binary partitions.

From the zip, the initsd loads a protocol stack module MODEM Firmware (modem firmware) of a modem, and then loads recovery.img. The recovery.img is a module specially used by the Android system for updating the system, and may integrate multiple updating modules. In this way, a "Google OTA update" mode may be started. Compatible with the OTA upgrade, the zip file may be used to update relevant partitions of the Android system and relevant partitions of the modem.

The mobile communication terminal in the embodiment of the present invention may load the MODEM Firmware and the Android system directly without installing them. The following describes the process, taking a Qualcomm MSM7x25 platform as an example.

Figure 7:
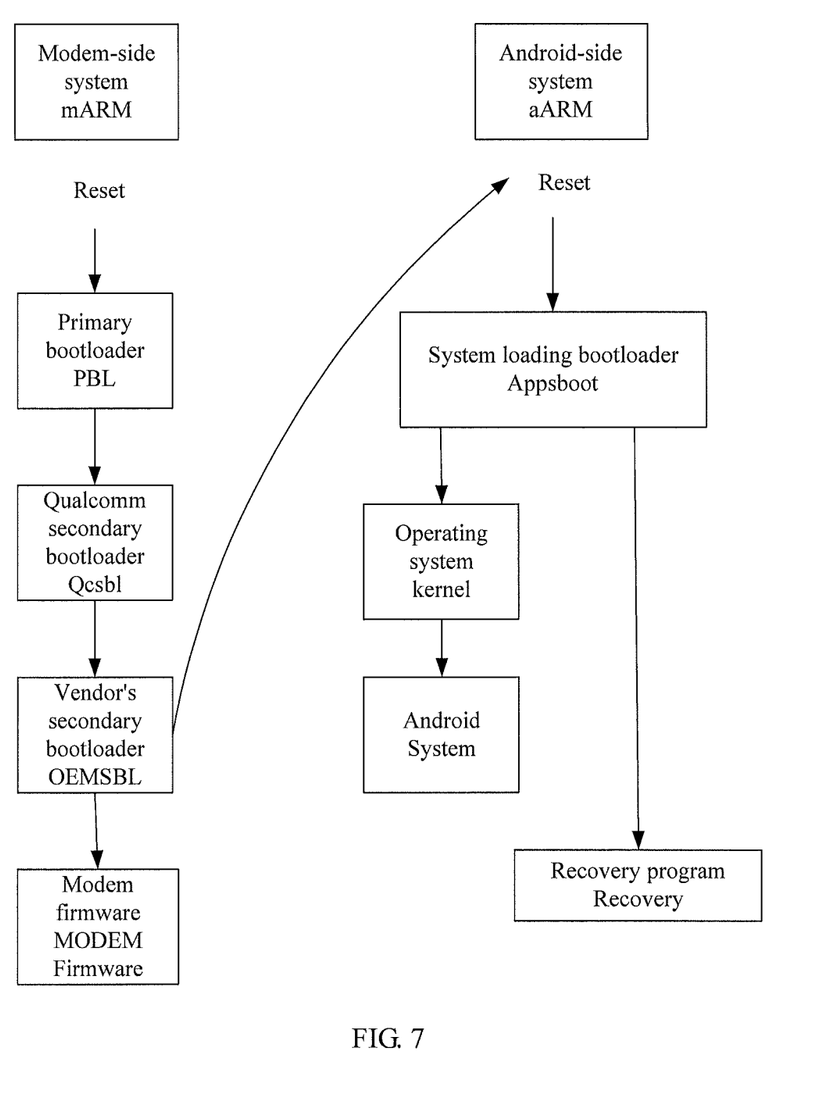
FIG. 7 shows a normal startup process of a mobile communication terminal according to an embodiment of the present invention.

FIG. 7 shows a normal startup process of a mobile communication terminal according to an embodiment of the present invention. Each partition is on a Nand Flash, mARM is a modem-side system, aARM is an android-side system, the PBL (Primary BootLoader, primary bootloader) is inherently in a chip (for booting), and others are names of partitions, where Kernel is a primary part of boot.img, Kernel is an Android operating system kernel that includes core working modules such as an operating system time slice scheduling module, a memory management module, and a hardware driver module, and the boot.img further includes a ramdisk root directory file system.

Figure 8:
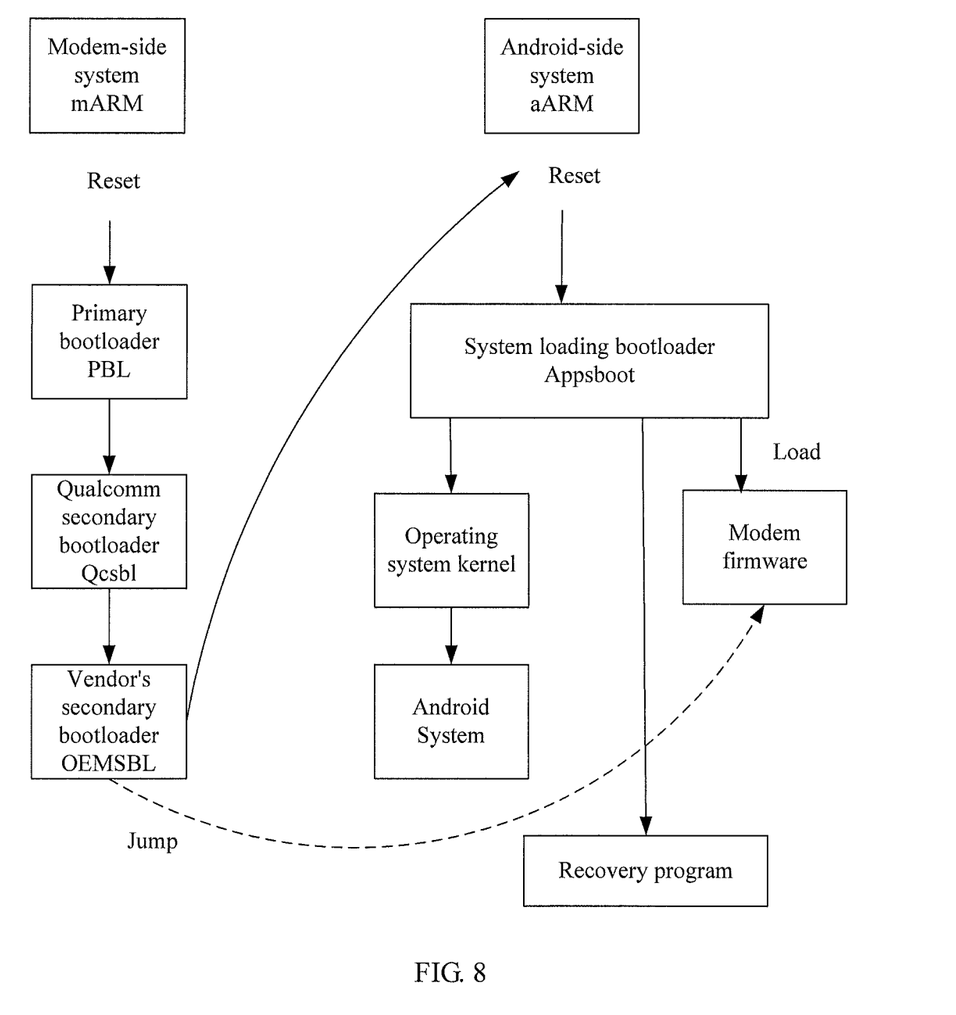
FIG. 8 shows an installation-free startup process of a mobile communication terminal according to an embodiment of the present invention.

FIG. 8 shows an installation-free startup process of a mobile communication terminal according to an embodiment of the present invention. Each partition is on a Nand Flash, mARM is a modem-side system, aARM is an android-side system, the PBL is inherently in a chip, QCSBL and OEMSBL are necessary partitions on the NAND FLASH of a mobile phone and are similar to BIOS (Basic Input Output System, basic input output system) firmware inherently in a mainboard on a PC; others are files or directories in the SD card. After being installed, such parts are integrated with the mobile phone but are not necessary for starting the mobile phone before installation.

As shown in FIG. 8, the Initsd (enhanced Appsboot, where Appsboot is a boot module for loading an Android system)

loads the MODEM Firmware from the zip file into a corresponding position in the memory, and, through a shared memory setting flag, notifies the OEMSBL (OEMSBL needs to poll the flag at this stage) so that the OEMSBL jumps to an entry of the MODEM Firmware.

Afterward, the initsd can load the boot.img (linux Kernel) smoothly. Because the platform is MSM7x25, loading the MODEM Firmware is a necessary condition for starting the kernel.

The root directory file system of the boot.img is Ramdisk (a memory disk, which includes user space data that needs to be set first and user space programs that need to run first after the kernel is initialized), and needs to be modified for loading a complete Android System from the zip file. For the initsd, reading the SD card is relatively simple. The detailed method for modifying the boot.img includes the following:

1) Add applications required for reading and writing an SD card, such as VOLD (Volume Daemon, disk device daemon), into the Ramdisk root directory file system of the boot.img. Currently, the void program exists in "system" rather than "boot.img". That is, before the "system" is loaded, the SD card needs to be mounted (mount) so that the boot.img can read and parse the system backup files on the SD card. The VOLD is a device management tool preset in Android, and runs as a daemon process and manages device files in the /dev directory by monitoring uevent events sent by the kernel. It works in a user space (user space) rather than a kernel space (kernel space).

2) Integrate a fuse-zip file system. fuse-zip is a result of extending a user space file system fuse, and its latest version is capable of reading and writing a zip file. As a kernel module loadable on a UNIX-like system platform, the user space file system fuse allows a non-privileged user to create a file system that has complete functions, without re-compiling the kernel. The Fuse module provides only an interface for accessing the kernel module, and its own implementation codes are primarily located in the user space.

Direct compression is also practicable if no fuse-zip file system is used. A file in the system partition is decompressed to a directory in the SD card, and is associated with the /system directory of the root file system so that the system can read and start the android. Files in a userdata partition may be copied to a tmpfs file system (a memory-based file system) of the memory, or, the files are decompressed from the zip file to the SD card.

It should be noted that a mobile phone (taking an MSM7x25 platform as an example) should include at least: MIBIB (Multi-Image Boot Information Block, multi-image boot information block), QCSBL, OEMSBL, and OTP (One-time Password, dynamic password), where the OTP is related to update authentication and exists in the OEMINFO partition. The four partitions occupy about 10 MB, which is similar to the BIOS of a PC.

The OEMSBL is capable of reading an initsd (appsboot.mbn) file from an SD card and loading the file into a memory. In this way, during the update of different versions, only the initsd needs to be changed, where the initsd may be stored in the system partition beforehand. The MIBIB, QCSBL, OEMSBL, and OTP will not affect future updates even if they are not updated, thereby reducing risks of system update failure. Of course, the first three parts may also be updated. The initsd file supports the zip file and parses files in the zip file, supports the update of all partitions, and supports reading and writing of the SD card, and can load the MODEM Firmware, Boot.img, or Recovery.img as required.

Step 330: Update the kernel driver of the target mobile terminal.

In the embodiment of the present invention, the kernel driver is divided into codes and configuration data. The codes are relatively fixed, and the configuration data can control the codes to follow different branches. The configuration data includes data similar to script information. A kernel module, that is, a SysData Module, is added to be specially responsible for parsing and installing the configuration data during initialization. Further, sets of small execution units may be established, and respectively associated with the existing functions, and therefore, the functions of the existing driver are changed. The configuration data may be imported and installed from the user space when the kernel runs, or exported from the kernel and stored. Reference may be made to FIG. 3B again.

The Implementation Comes in 4 Parts:

1. Modification in driver codes: Insert a uniform interface function of SysData (system data management module) into a function to be modified, input"_func_" (which is actually a string of the function name) as a parameter, and input the sequence number of the current process point in the function as a parameter. That is equivalent to registering a process point. A process point includes information about the specific function name and sequence number of the modification point in the function.

2. Conversion performed when the configuration data is imported to the SysData: The configuration data includes: at which process point, which sub-processes are called, and which a parameter is input. Multiple sub-process points need to be stored in the SysData by using a link table. One process point may include multiple sub-processes, which need to be stored by using a sub-link table. Therefore, a mapping table needs to be established for implementing conversion. The content of the mapping table includes the function name corresponding to the process point sequence number, sequence number of the modification point, and sub-process name corresponding to the sub-process sequence number.

3. Establishment of a sub-process function library: Value assignment to a variable may be converted into a function call. In the SysData, all functions to be called and variables are numbered, which provides a basis for compiling script information. Of course, to enrich functions, the SysData needs to extend its sub-process function library and be capable of parsing more syntaxes.

4. The SYSDATA module matches the parameter (process point) input through the driver codes with the corresponding points in the link table to obtain all sub-processes and a parameter included in the process point, and then calls the sub-process functions one by one, and imports the parameter.

The following gives an exemplary description with reference to an accompanying drawing.

Figure 9:
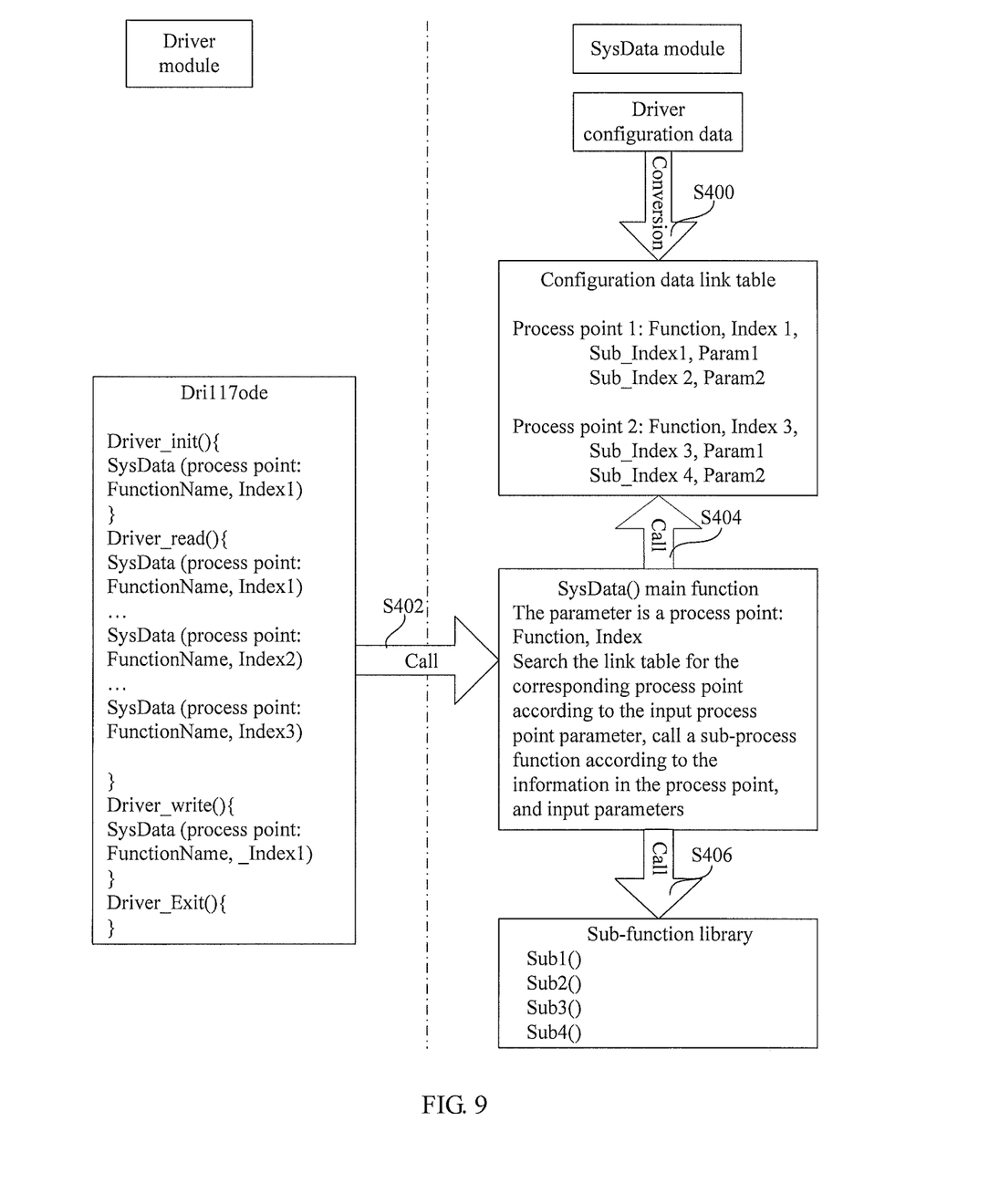
FIG. 9 is an interaction flowchart of a kernel update performed by a driver module in a kernel driver of a mobile communication terminal and a system data management module according to an embodiment of the present invention.

FIG. 9 is an interaction flowchart of a kernel update performed by a driver module in a kernel driver of a mobile communication terminal and a system data management module according to an embodiment of the present invention. As shown in FIG. 9, the procedure includes the following steps:

Step 400: A SYSDATA module converts driver configuration data into a configuration data link table according to a mapping table.

Step 402: A driver module calls a SysData( ) main function, and transfers a function name and process point sequence number to the SYSDATA module. For example, a driver initialization function Driver_init( ) calls the SysData( ) main function, and inputs a function name and a modification point sequence number to the SYSDATA module.

Step 404: The SYSDATA module converts the input parameter into a process point sequence number, and searches the configuration data link table for the corresponding node. For example, the SYSDATA module finds a matched process point 1 in the configuration data link table according to the input function name and the process point sequence number.

Step 406: The SYSDATA module calls the corresponding sub-process function in a sub-process function library according to the matched process point information, and inputs a parameter. For example, process point 1 is matched, and the sub-process function number and the parameter information corresponding to process point 1 are Sub_Index1, Param1; "Sub_Index2, Param2" respectively. Therefore, Sub1 ( ) and Sub2 ( ) are called in the sub-function, Param1 is input into Sub1 ( ), and Param2 is input into Sub2 ( ) Now the kernel driver is updated.

The advantages of the embodiment of the present invention lie in that the kernel driver is updated.

The foregoing embodiments are merely intended for describing the technical solutions of the embodiments of the present invention other than limiting the present invention. Although the embodiments of the present invention are described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for performing a system update between mobile communication terminals, comprising:
   obtaining, by a target mobile communication terminal through a wireless network communication with a source mobile communication terminal, hardware information of the source mobile communication terminal;
   determining, by the target mobile communication terminal, whether hardware of the target mobile communication terminal is compatible with hardware of the source mobile communication terminal, according to the obtained hardware information, the determining, by the target mobile communication terminal, includes a determination of compatibility based upon whether the target mobile communication terminal has a same hardware version identifier BoardID as the hardware of the source mobile communication terminal;
   in response to the determination of compatibility that the hardware of the target and the source mobile communication terminals are compatible, obtaining, by the target mobile communication terminal through the wireless network communication, a system backup file of the source mobile communication terminal; and
   performing, by the target mobile communication terminal, a system update according to the obtained system backup file.

2. The method according to claim 1, further comprising:
   determining, by the target mobile communication terminal when the target mobile communication terminal determines that the target mobile communication terminal has a different hardware version identifier BoardID from the source mobile communication terminal, whether both terminals have a same minor hardware version number, and, in response to a determination that both terminals have a same minor hardware version number, determining that the hardware of target and source mobile communication terminals are compatible.

3. The method according to claim 2, further comprising:
   determining, by the target mobile communication terminal when the target mobile communication terminal determines that the target mobile communication terminal has a different minor hardware version number from the source mobile communication terminal, whether both terminals have a same processor, memory, and network type, and, in response to a determination that both terminals have a different processor, memory, and network type from each other, determining that the hardware of the target and source mobile communication terminals are incompatible; and
   determining, by the target mobile communication terminal when the target mobile communication terminal determines that the target mobile communication terminal has the same processor, memory, and network type as the source mobile communication terminal, whether both terminals have a same driver identifier DriverID, and, in response to a determination that both terminals have a same driver identifier DriverID, determining that the hardware of the target and source mobile communication terminals are compatible.

4. The method according to claim 1, further comprising:
   displaying, on a user-machine interface of the target mobile communication terminal, a hardware compatibility report or an hardware compatibility index between the target mobile communication terminal and the source mobile communication terminal.

5. The method according to claim 1, wherein:
   the performing, by the target mobile communication terminal, a system update according to the system backup file, comprises:
      installing, by the target mobile communication terminal, the obtained system backup file to perform the system update; or running, by the target mobile communication terminal, the system backup file directly without installing the system backup file.

6. The method according to claim 1, wherein the performing the system update comprises:
   obtaining driver configuration data;
importing the driver configuration data into a kernel of an operating system of the target mobile communication terminal;
   mapping the driver configuration data into a configuration data link table, wherein the configuration data link table comprises a process point sequence number, a sub-process function number corresponding to the process point sequence number, and a parameter of a sub-process function;
searching, when a driver of the kernel needs to be updated, the configuration data link table for a process point corresponding to an input process point sequence number;
   obtaining, from the configuration data link table, a sub-process function number corresponding to the process point and a parameter of a sub-process function, according to the process point searched; and
   calling a sub-process function corresponding to the sub-process function number in a sub-process function library, and inputting the parameter of the sub-process function to update the kernel driver.

7. A mobile communication terminal, comprising:
non-transitory computer readable storage medium to store a program(s); and
computer hardware configured, including configured by the program(s), to:
   establish a wireless communication connection with a source mobile communication terminal to obtain hardware information and system backup file of the source mobile communication terminal;

determine, according to the hardware information of the source mobile communication terminal, whether hardware of the target and source mobile communication terminals are compatible, and in response to a determination that the hardware of the target and source mobile communication terminals are compatible, trigger obtaining the system backup file from the source mobile communication terminal; and perform a system update according to the system backup file, wherein:

the hardware information comprises a hardware version identifier BoardID, and the computer hardware is further configured to determine that the hardware of the target and source mobile communication terminals are compatible when the BoardID is same between the target mobile communication terminal and the source mobile communication terminal.

8. The mobile communication terminal according to claim 7, wherein:

the hardware information further comprises a minor hardware version number, and the computer hardware is further configured to determine that the hardware of the target and source mobile communication terminals are compatible when the BoardID is different but the minor hardware version number is same between the target mobile communication terminal and the source mobile communication terminal.

9. The mobile communication terminal according to claim 8, wherein:

the hardware information further comprises processor information, memory information, and a network type, and the computer hardware is further configured to:

when neither the BoardID nor the minor hardware version number is same between the target mobile communication terminal and the source mobile communication terminal, further determine whether the processor information, the memory information, and the network type are same between both terminals, and, in response to a determination that both terminals have a different processor information, the memory information, and the network type from each other, determine that the hardware of the target and source mobile communication terminals are incompatible; and the hardware information further comprises a driver identifier DriverID, and the computer hardware is further configured to:

if neither the BoardID nor the minor hardware version number is same, but the processor information, the memory information, and the network type are same between the target mobile communication terminal and the source mobile communication terminal, further determine whether the DriverID is same between both terminals, and, in response to a determination that the DriverID is same between the both terminals, determine that the hardware of the target and source communication terminals are compatible.

10. The mobile communication terminal according to claim 7, wherein:

the computer hardware is further configured to install the obtained system backup file to perform the system update; or run the system backup file directly without installing the system backup file.

11. The mobile communication terminal according to claim 7, wherein:

to perform the system update, the computer hardware is further configured to:

obtain driver configuration data;

import the driver configuration data into a kernel of an operating system of the target mobile communication terminal; and map the driver configuration data to a configuration data link table, wherein the configuration data link table comprises a process point sequence number, a sub-process function number corresponding to the process point sequence number, and a parameter of a sub-process function;

when a driver of the kernel needs to be updated, perform:

search the configuration data link table for a process point corresponding to an input process point sequence number;

obtain, from the configuration data link table, a sub-process function number corresponding to the process point and a parameter of a sub-process function, according to the process point searched; and call a sub-process function corresponding to the sub-process function number in a sub-process function library, and input the parameter of the sub-process function to update the kernel driver.

12. A system for performing a system update between mobile communication terminals, comprising:

a target mobile communication terminal, configured to:

obtain, through a wireless network communication with a source mobile communication terminal, hardware information of the source mobile communication terminal, perform a determination, according to the hardware information of the source mobile communication terminal, whether hardware of the target mobile communication terminal is compatible with hardware of the source mobile communication terminal based upon whether the target mobile communication terminal has a same hardware version identifier BoardID as the hardware of the source mobile communication terminal, obtain a system backup file of the source mobile communication terminal, in response to the determination that the hardware of the target and source mobile communication terminals are compatible, and perform a system update according to the system backup file.

13. A system comprising:

a source mobile communication terminal configured to transmit hardware information of the source mobile terminal and a system backup file; and a target mobile communication terminal configured to:

receive, through a wireless network communication with the source mobile communication terminal, the hardware information of the source mobile communication terminal, and perform a determination, according to the hardware information of the source mobile communication terminal, whether hardware of the target mobile communication terminal is compatible with hardware of the source mobile communication terminal based upon whether the target mobile communication terminal has a same hardware version identifier BoardID as the hardware of the source mobile communication terminal;

receive the system backup file of the source mobile communication terminal, in response to the determination that the hardware of the target and source mobile communication terminals are compatible; and perform a system update according to the system backup file.

* * * * *